April 5, 1949.  W. A. RAY  2,466,274

THERMOCOUPLE FOR FUEL BURNERS

Filed Nov. 5, 1940  5 Sheets-Sheet 1

INVENTOR
WILLIAM A. RAY
BY John Flam
ATTORNEY

April 5, 1949. W. A. RAY 2,466,274
THERMOCOUPLE FOR FUEL BURNERS

Filed Nov. 5, 1940 5 Sheets-Sheet 3

INVENTOR
WILLIAM A. RAY
BY John Flam
ATTORNEY

Patented Apr. 5, 1949

2,466,274

UNITED STATES PATENT OFFICE 2,466,274

THERMOCOUPLE FOR FUEL BURNERS

William A. Ray, Glendale, Calif., assignor to General Controls Co., a corporation Application November 5, 1940, Serial No. 364,356

5 Claims. (Cl. 136—4)

This invention relates to a system for controlling the operation of a fuel burner, as may be utilized for furnaces. An example of a system of this general character whereby it is assured that the supply of fuel will be discontinued and the igniting means deenergized in the event the burner fails for any reason, is shown in Patent No. 2,113,858, issued on April 12, 1938, in the name of William A. Ray, and entitled "Control unit." However, the invention may be embodied in a gas burner furnace system, utilizing a pilot flame for ignition.

This application is a continuation in part of a prior application, filed September 21, 1939, for Thermoelectric device, in the name of William A. Ray, and having Serial No. 295,998, now abandoned.

The system necessarily includes a device responsive to a phase of operation of the burner or the pilot for initiating a control function. Such a device is conveniently a thermocouple, exposed to the heat of the burner or of the pilot as by radiation, convection or both, and generating an electric current for the operation of a relay or other control element.

It is one of the objects of this invention to improve the operation of such systems, especially by simplification of the thermocouple structure.

Such thermocouple structures necessarily include a pair of conductors of dissimilar metals, which are joined or fused together to form one or more "hot" junctions. When the temperature of the hot junctions suitably exceeds that of other junctions, between the conductors or in the thermocouple circuit, there is a generation of electrical energy in the circuit. All this is now well understood and no further explanation thereof is required.

In the event of flame failure (as of a main oil burner or of a pilot flame), it is essential that the thermocouple respond promptly to this condition, so that the fuel supply may be shut off and the system rendered inactive. By the aid of this invention, these effects are obtained, since the thermocouple junctions promptly assume substantially equal temperatures.

It is another object of this invention to simplify the thermocouple structure that may operate in this desired manner, even when both the cold and hot junctions are actually placed in the flame of the burner. The required temperature effect is obtained by the effect of the metal conductors forming the junctions upon flame temperature neighboring the metal members, or by the shielding effect of one conductor upon the other, or by a combination of these two effects. When the thermocouple is subjected only to radiant heat and away from the flame, similar temperature differential effects are obtained by appropriately positioning the conductors and junctions.

It has been suggested, as for example in the Patent No. 2,139,504, issued December 6, 1938, to W. J. King, that a thermocouple structure might be used in which generation of the thermoelectric current occurs as a transient phenomenon. Thus the thermoelectric current flows for a limited interval when it is first subjected to the source of heat; and correspondingly, it flows for another limited interval upon making the source of heat inactive. These transient effects are intended to be utilized in the control apparatus described by King. While King also suggests a form of thermocouple mounting that is intended to maintain a constant temperature differential between the hot and cold junctions during operation of the furnace, the temperature differential in that case is stated to be due to the use of special means for facilitating heat transfer from the cold junctions.

It is accordingly another object of this invention to ensure that the thermocouple structure operates steadily to generate a current when the hot and cold junctions are exposed substantially equally to a source of heat, and without the necessity of employing any special expedient for transfer of heat to or from the junctions.

This invention possesses many other advantages, and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of this invention is best defined by the appended claims.

Referring to the drawings.

Figure 1:
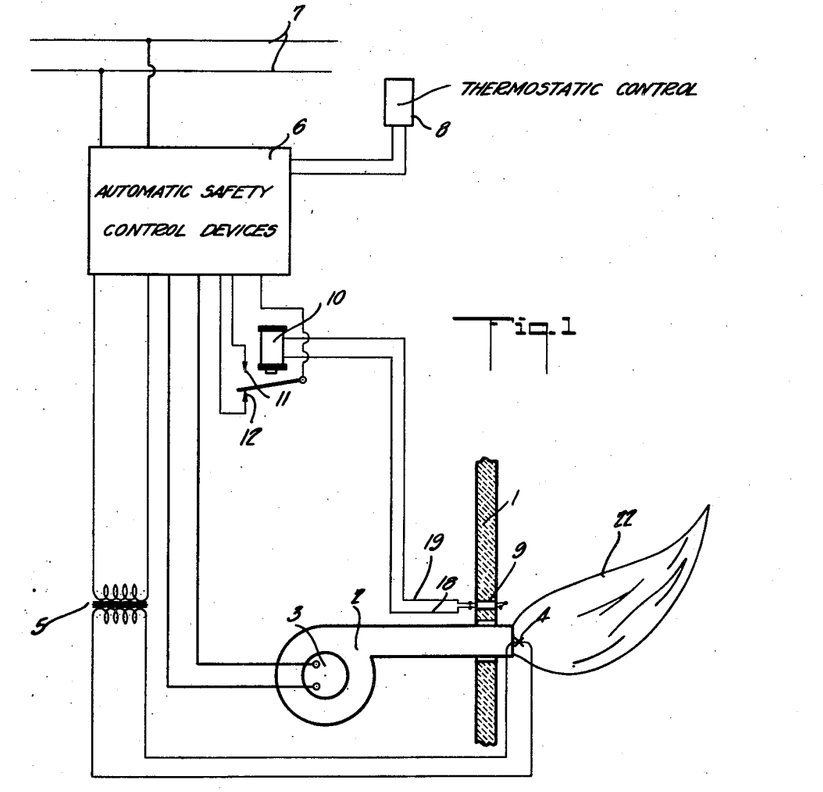
Figure 1 is a diagrammatic representation of a system incorporating the invention.
Figure 2:
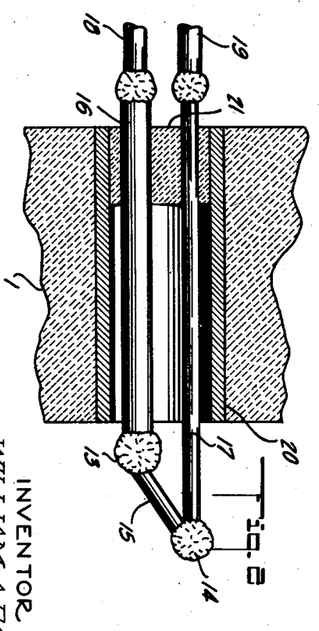
Fig. 2 is an enlarged sectional view of a thermocouple structure utilized in the system of Fig. 1.

In the forms shown in Figs. 1 and 2, the furnace wall 1 may serve to define a furnace space, in which fuel, for example oil in divided form, may be burned; however other fuels, liquid, gaseous, or solid, may be utilized. The supply of fuel into the furnace space is shown as provided by an oil burner structure 2 having a blower motor 3 therefor, and provided with vaporizing means. The burner flame 22 is shown as extending substantially horizontally, although in some instances it may take other positions. The ignition of the vaporized fuel is shown as being accomplished by an electric spark or ignition device 4 adjacent the oil burner opening. This ignition device 4 is shown as being supplied with energizing current at the proper electromotive force, from the secondary winding of a suitable transformer 5.

In the operation of oil burners that are intended to be under the control of a thermostat, it is quite essential to ensure that the burner 2 and the blower motor 3 will be shut down in the event that the fuel fails to ignite; and also in the event that after ignition, the flame fails for any reason. In this way, fuel waste is stopped and dangerous fire hazards are obviated. Furthermore, it is desired automatically to disconnect the igniting means 4 after the system is in full operation.

This general type of automatic control is known; one form thereof is illustrated in the prior patent to W. A. Ray hereinbefore referred to. The automatic safety control devices needed for such a system are indicated diagrammatically by the rectangle 6. The electrical energy for operating the control system and the blower motor 3 may be supplied from the mains 7.

The initiation of the operation of the oil burner 2 and its cessation are ordinarily determined by a thermostatic control device 8. This thermostatic controlling device may be located in any appropriate place the temperature of which it may be desired to control; for example, in the room of a dwelling or other building.

For suitably causing the operation of the automatic safety control devices, a temperature responsive device 9 is utilized, which is subjected to the heat of the burner flame and responds thereto. The heat of the burner flame causes the device 9 to become active; a relay 10 is thereupon energized and its front contact 11 is closed, whereby the automatic system 6 acts to disconnect the transformer 5 from its source of energy, thereby deenergizing the ignition device 4. In the position shown in Fig. 1, the relay 10 is unenergized, the back contact 12 being closed. This condition may exist at the start of the operation of the furnace. When the thermostatic control means 8 causes energization of the ignition device 4, the circuits completed by back contact 12 are such as temporarily to maintain the ignition circuit active. If after a short time the relay 10 is still un-energized, indicating a failure of the burner 2 to light, then the automatic safety control devices operate to shut down the system by deenergizing motor 3 and the ignition means 4.

On the other hand, if the burner 2 is ignited within a short period after thermostat 8 operates, the automatic system maintains motor 3 energized, but operates to deenergize the circuit of igniting means 4.

When the thermostatic control device 8 is in such condition as to necessitate the shutting down of the oil burner 2, the automatic safety control devices 6 operate immediately to open the circuit for the motor 3 and to maintain the ignition circuit deenergized. In the event of flame failure also, the same results are obtained, due to the response of the device 9 to the lowered temperatures in the furnace chamber.

The thermal responsive device 9 is in the form of a thermocouple, and this thermocouple is of such character that it will generate a sufficient current to operate the relay 10 when the burner 2 is active. The structure of the thermocouple is shown to best advantage in Fig. 2.

The thermocouple device has a pair of junctions 13 and 14. These junctions are both subjected to the radiation from flame 22, as by being exposed within the furnace chamber. The thermocouple 9 may be placed as closely to the nozzle of burner 2 as desired, although this spacing is not critical, so long as the junctions are subjected to the intense radiation of the flame. The conductors forming these junctions are of such character, as will be hereinafter described, as steadily to maintain the temperature of the junction 14 suitably above the temperature of the cold junction 13, in spite of the fact that both junctions are subjected to the radiant heat of the flame, and that the system is operating in a state of equilibrium. How this effect is secured will now be described.

The cold junction 13 is formed by the fusion of a short conductor 15 to a terminal conductor 16. The hot junction 14 is formed by the fusion of the short conductor 15 with a conductor 17. Conductor 15 is made from a metal or alloy dissimilar from the metal or alloy of which conductors 16 and 17 are made. Thus for example, conductor 15 may be made from "Chromel," an alloy which can withstand quite high temperatures; and conductors 16 and 17 may be made from "Copel," which is also capable of withstanding high temperatures. In the arrangement illustrated, the junctions 13 and 14 are both exposed to the radiant heat of the flame temperatures; however, the temperature gradients (as may be determined, for example, by thermal conductivity of the conductors, or by the spatial relationship of the junctions to the flame), are purposely made such that the temperature of the hot junction 14 remains suitably elevated above that of cold junction 13. Such an effect may be obtained even when the thermal conductivities of the conductors 15, 16 and 17 are substantially equal; such a form will be described hereinafter.

In the form shown in Fig. 2, the mass of conductor 16 subjected to furnace temperatures is purposely made greater than that of conductor 17; for example by an increase in sectional area. Also, the junctions 13 and 14 are placed preferably quite closely together so that they may be substantially equally subjected to the heat of flame 22.

Due to the difference in mass of conductors 16 and 17, the furnace temperature adjacent the junction 13 is less than at junction 14 connected to the smaller mass 17. This is partly due to the more rapid withdrawal of heat from the surrounding heated gases through the mass 16. The effect is enhanced by the normal greater temperature of the furnace chamber at the junction 14 which is purposely placed farther within the furnace chamber.

The intermediate "Chromel" conductor 15 is also of small sectional area, such as conductor 17, so as to retard transfer of heat by conduction from junction 14.

The choice of "Copel" for the end conductors 16 and 17 and of "Chromel" for the intermediate conductor 15 is made purposely; "Copel" has greater electrical and thermal conductivity than "Chromel"; and therefore a more pronounced inequality in the temperatures at the junctions is obtained.

The conductors 16 and 17 may be joined to the leads 18 and 19, connecting the thermocouple 9 to the relay 10 in any appropriate manner. The coil of relay 10 thus completes the thermocouple circuit. The connection between conductors 16 and 18, and the connection between conductors 17 and 19 have no appreciable effect upon the operation of the thermocouple, since the thermoelectric junctions thus formed produce substantially equal but opposing electromotive forces.

A practical embodiment of the invention may be made in which conductors 15 and 17 are of No. 18 gauge wire; and conductor 16 is of No. 12 gauge wire. The lead-in wires 18 and 19 may be of No. 14 gauge copper wire. The element 15 between the junctions may have a length of the order of $\frac{3}{16}$ inch.

One manner in which the thermocouple structure may be supported by the wall 1 is indicated in Fig. 2. Thus a tube lining 20 may be provided for an aperture through the wall 1. Through this aperture the conductors 16 and 17 extend. These conductors may be supported in spaced relation in the tube 20, as by the aid of a refractory plug 21, through which the conductors 16 and 17 pass. This plug structure 21 may be appropriately supported, as by an adherent, in the interior of the tube 20. The space in lining 20 that is not occupied by the conductors 16 and 17 and block 21 is in communication with the furnace chamber and the heated gases therein.

Figure 7:
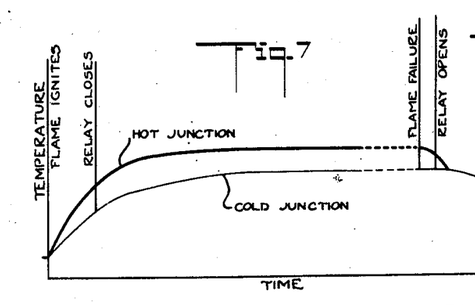
Fig. 7 is a graph exemplifying the operation of the control system when utilizing the invention.

The mode of operation of the system may now be summarized. For this purpose reference may be had to Fig. 7. Assuming that the furnace is started from a cold condition, and that thermostat 8 operates to permit the automatic system to go into action, the burner 2 and ignition means 4 are operated. As soon as the flame 22 ignites, the temperature of junction 14 rises steeply until a constant temperature is attained. This may take a matter of seconds. The temperature of junction 13 meanwhile rises more slowly. During this transient period, a sufficient temperature difference is obtained to energize relay 10; and front contact 11 of relay 10 is active. The ignition means 4 is deenergized. The junction 13 assumes an equilibrium temperature below that of junction 14. While this temperature difference is not as great as required to operate relay 10, yet it is ample to ensure against dropping out of the relay.

After the furnace is in operation for a while, the thermostat 8 may return to a position in which the burner 2 should be rendered inactive; or there may be a flame failure. Under such circumstances the safety devices are operated to deenergize the motor 2.

Now in the event of a flame extinguishment, the thermocouple structure 9 reacts quickly to return the system to an inactive condition. This quick reaction follows a reduction in the temperature in the furnace chamber, and just as soon as the flame no longer acts to transmit heat to the thermocouple junctions. Under such circumstances, the flow of heat to the thermocouple junctions is stopped; the heat stored in conductors 15, 16 and 17 causes a prompt equalization of the junction temperatures by an equalizing flow. This point is illustrated by the conjunction of the hot and cold junctions temperature graphs at the right hand portion of Fig. 7. The hot junction rapidly loses heat, the cold junction more slowly. The heated walls of the furnace do not interfere with this equalization as the heat effect of the walls is not comparable with that of the flame 22, which is the predominating factor in transmitting heat to the thermocouple structure.

By employing a sufficiently sensitive relay 10, a single pair of thermocouple junctions 13 and 14 is sufficient to close the relay at the beginning of flame operation and to maintain the relay closed until the flame 22 fails or is otherwise extinguished. It has been found that as much as six or seven millivolts may be produced by the thermocouple structure during equilibrium conditions. When the resistance of the complete load circuit is of the order of 0.060 ohm, the power thus produced is 0.6 milliwatt. It has been found that when the flame 22 is extinguished, the voltage across the terminals of relay 10 drops in a few seconds to releasing value, as illustrated by the point in the diagram of Fig. 7 labeled: "Relay opens."

However, in some instances it may be desirable to multiply the thermoelectric current, as by using a plurality of thermocouples in series. Such an arrangement is illustrated in Figs. 3 to 6 inclusive.

Figure 3:
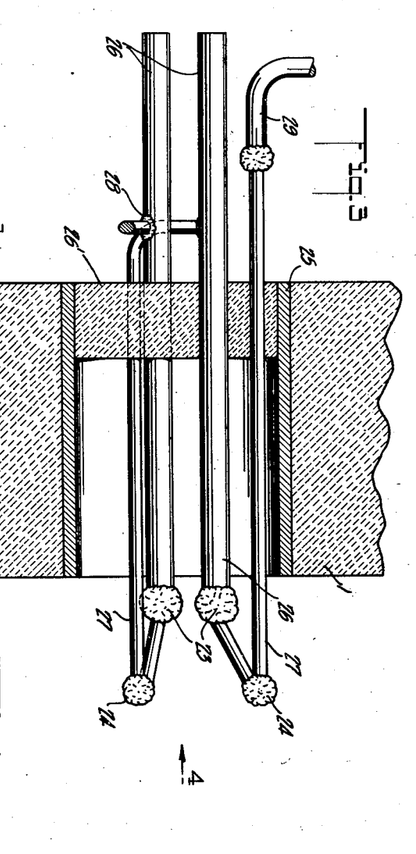
Fig. 3 is a sectional view, similar to Fig. 2, but illustrating a form of the invention in which a series of pairs of thermocouple junctions is utilized, the section being taken along the plane 3—3 of Fig. 5.
Figure 4:
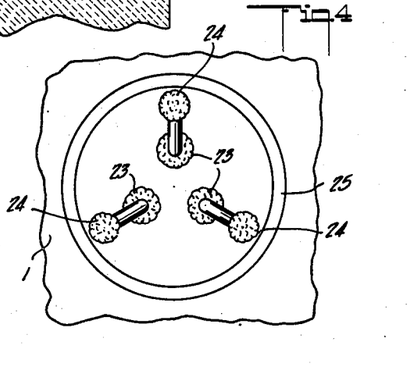
Fig. 4 is an end view, as seen in the direction of the arrow, from the right hand of Fig. 3.
Figure 5:
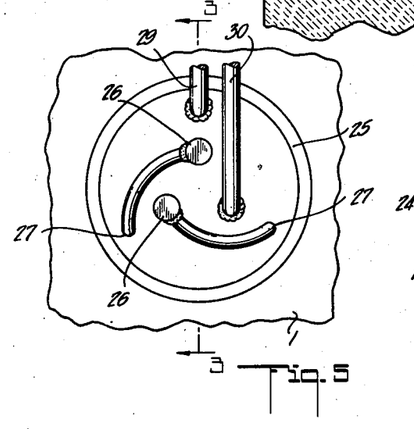
Fig. 5 is an end view of the structure illustrated in Fig. 3 taken from the left hand end thereof.

Thus, instead of having a single pair of thermocouple junctions, there are three such pairs. Each of the pairs has a cold junction 23 and a hot junction 24, made substantially identically with the construction illustrated in Fig. 2. The three pairs of thermocouple junctions 23, 24, may be arranged equi-angularly about the axis of the enveloping tube 25. The plug 26', corresponding to plug 21 of Fig. 2, is adapted to be retained in any suitable manner within the tube 25.

Figure 6:
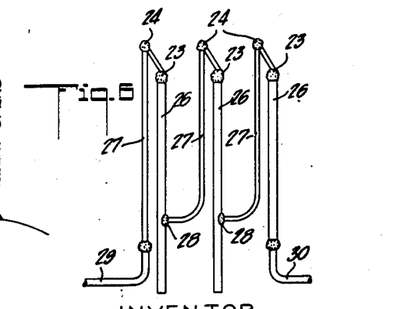
Fig. 6 is a diagram illustrating the manner in which the multiple pairs of junctions may be connected together in series.

The conductors 26 leading from the cold junctions 23, and the conductors 27 leading from the hot junctions 24, pass outwardly through the wall 1, and may be connected in series arrangement in the manner illustrated in Fig. 6. Thus two of the conductors 27 may be joined, as by welding or fusing, to points 28 upon two of the large conductors 26. The third of the large conductors 26, and the third of the small conductors 27 act as the terminals of the thermocouple structure.

To these terminal conductors, may be fused the copper conductors 29 and 30.

The mode of operation of the multiple thermocouple structure is substantially identical with that described in connection with Fig. 2. All of the thermocouple junctions 23 and 24 are substantially uniformly exposed to the heat of the flame 22. This flame 22 is the predominant factor in transferring heat to the thermocouple junctions. Due to the fact that the conductors 26 reduce the temperature of the heated gases to a greater extent than the conductors 27, and can conduct heat at an increased rate, as compared with conductors 27, the temperature of junctions 23 are maintained suitably below the temperatures of the corresponding junctions 24. The electromotive forces produced at the hot junctions are additive by the series connections illustrated in Fig. 6.

It is possible so far as the principles of the invention are concerned, to provide the thermocouple structure for the same general effect in other relations. In the form illustrated in Figs. 8 and 9, the thermocouple structure is so arranged that the hot and cold junctions are placed directly within the flame of a burner to be controlled; for example such as the flame 31 of a pilot burner 32. This pilot burner may be of the usual Bunsen type. The thermocouple structure comprises conductors 33 and 34. Conductor 34 has a substantially greater cross sectional area than that of conductor 33. As before, both of these elements are preferably made of "Copel." Intermediate the extremities of the conductors 33 and 34 is the short third conductor 35 made of metal dissimilar to that of the conductors 33 and 34. For example, "Chromel" may be utilized for conductor 35. The junction 36, under equilibrium conditions, attains a temperature higher than the junction 37. This occurs for the reason that there is a greater mass of metal immediately adjacent couple 37 that is within the flame 31. This greater mass has the effect of cooling the flame more than the mass associated with junction 36. This cooling effect of metal interposed in a flame is known. Conductor 35 is short, and is of the order of $\frac{1}{16}$ inch. The conductor 34 may be of 14 gauge wire, and conductor 33 may be of 18 gauge.

Figure 8:
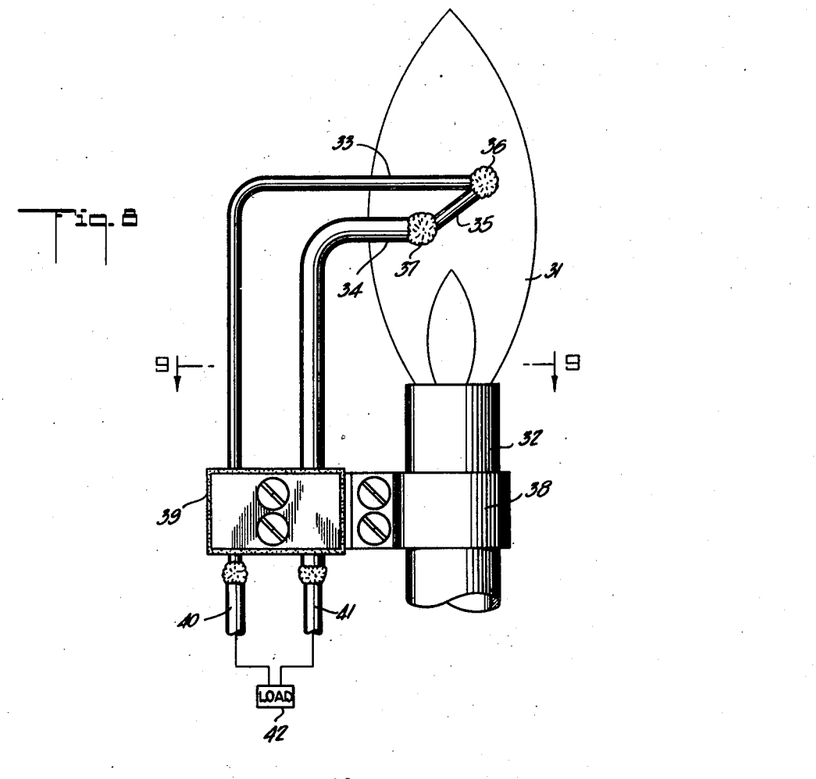
Fig. 8 is a side elevation of a modified form of the apparatus.
Figure 9:
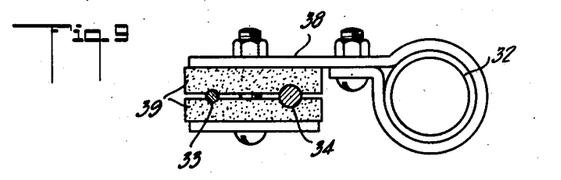
Fig. 9 is a sectional view taken along plane 9—9 of Fig. 8.

In order to support the elements of the thermocouple, use may be made of a bracket 38, clamped around the burner tube 32. This bracket supports a pair of blocks 39 of insulation material between which the end portions of conductors 33 and 34 are held. The copper lead wires 40 and 41 may be fused or welded to the lower ends of the conductors 33 and 34. These wires 40 and 41 may connect to a load 42 such as a sensitive relay, or an electromagnetically operated valve.

The different cooling effects of the conductors 33 and 34 may be obtained in other ways than by a difference in the cross sectional areas, as for example by the aid of metals having different specific thermal conductivities. Under such circumstances the conductors forming the junctions must nevertheless still have sufficient dissimilarity to generate the desired thermoelectric currents.

The bridge conductor 35, corresponding to the bridging conductor 15 of Fig. 2, being short, ensures that upon extinguishing of the flame 31, the thermocouple junctions 36 and 37 will rapidly attain equal temperatures. This effect is secured by the transfer of heat from conductor 34 to the conductor 33, through the intermediate conductor 35. This direction of heat transfer is due to the fact that the conductor 34 stores a greater amount of heat than the smaller conductor 33.

In this form of the invention, the effect of the thermocouple conductors on the flame temperature is utilized. There is some shielding of conductor 33 by conductor 34, due to the vertical arrangement but this is not sufficient to reduce materially the temperature of the hot junction 36.

Figure 10:
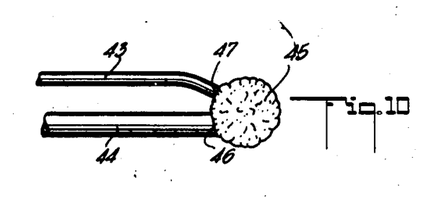
Fig. 10 is a fragmentary view of a further modification of the invention.

In order to provide a still more compact arrangement, it is possible to form the intermediate conductor in a manner illustrated in Fig. 10. In this instance the conductor 43 and the conductor 44 may both be made of Copel. The intermediate conductor 45 may be in the form of a ball of Chromel formed of fused metal applied to the extremities of conductors 43 and 44. The cold junction 46 is located at the place where the fused Chromel 45 joins the conductor 44. Similarly the hot junction 47 is located at the place where the Chromel ball 45 is fused to the conductor 43.

Various other forms utilizing the cooling effect of the thermocouple conductors upon the flame may be utilized. A few of them are shown diagrammatically in Figs. 11, 12, 13 and 14.

Figure 11:
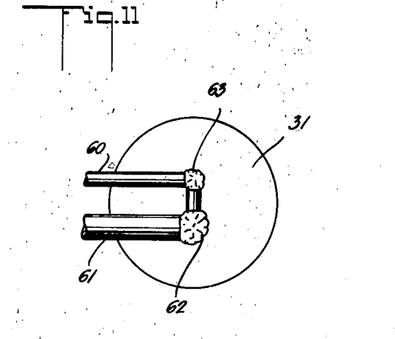
Figs. 11, 12, 13 and 14 are mainly diagrammatic views illustrating modified forms of thermocouple structures.

In Fig. 11, which is a plan view of flame 31, the thermocouple conductors 60 and 61 corresponding to conductors 33 and 34 of Fig. 8, are placed horizontally side by side; that is, both of them are substantially distant from the root of flame 31. Conductor 61 presents a greater mass to the flame 31 than conductor 60, because of the difference in cross section. The flame 31 is cooled more at the cold junction 62 than at the hot junction 63. The horizontal spacing of the conductors 60 and 61 is such that neither conductor is shielded from the full effect of the flame. The temperature differential is thus due substantially entirely to the different extent of cooling of the flame adjacent the junctions 62, 63.

Figure 12:
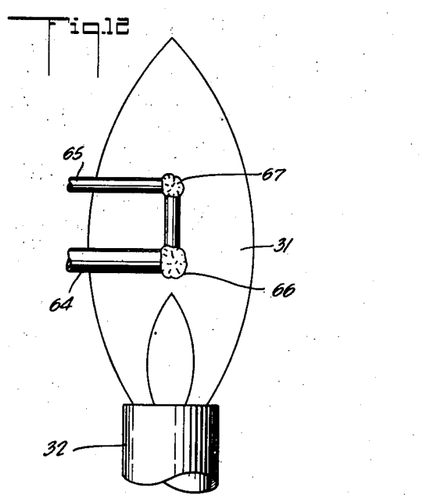

In Fig. 12, the arrangement is quite similar to that of Fig. 8, except that the lengths of the conductors 64, 65, subjected to the flame 31 are substantially equal, but conductor 64 has a greater mass in the flame. Accordingly junction 66 is cooler than junction 67. The cooling effect of the large mass predominates over the shielding effect of the large conductor.

Figure 13:
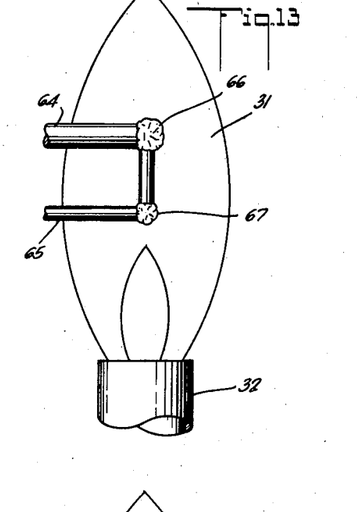

In Fig. 13, the arrangement in the flame 31 is the reverse of Fig. 12. The junction 66 is maintained colder than junction 67 because of the greater mass of conductor 66 in the flame. This effect is enhanced by the shielding effect of the conductor 65, since this conductor is interposed between the conductor 64 and the root of flame 31.

Figure 14:
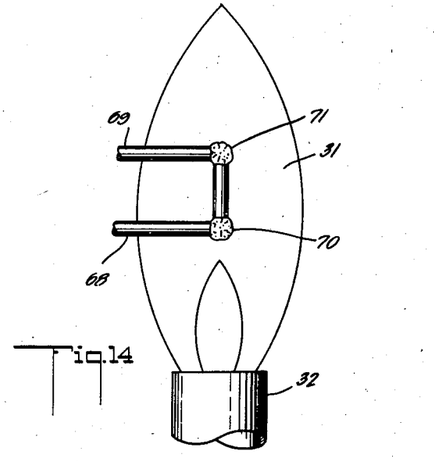

This shielding effect may be made the predominant factor, as indicated in Fig. 14. Here both conductors 68, 69 are of the same size and mass. Junction 71 is cooler than junction 70 because of the shielding effect of conductor 68 on conductor 69.

In some of the forms heretofore discussed, the hot and cold junctions were arranged to be maintained at suitably different temperatures by the cooling effect of the conductors which form the junctions in the flame. However, as stated heretofore, such a provision is not essential, if proper care is taken in positioning the thermocouple junctions. In the above examples it is assumed that there is no temperature gradient in that portion of the flame to which the thermocouples are subjected; the gradient in a Bunsen flame being, in fact, very small.

Figure 15:
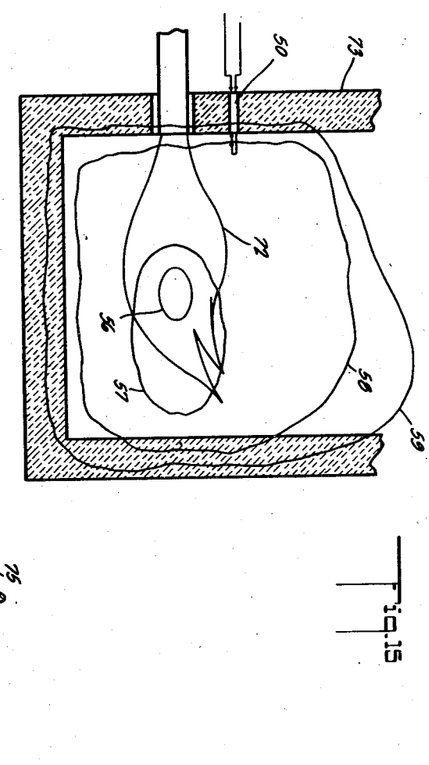
Fig. 15 is a view, similar to Fig. 1, of a further modified form of the invention.
Figure 16:
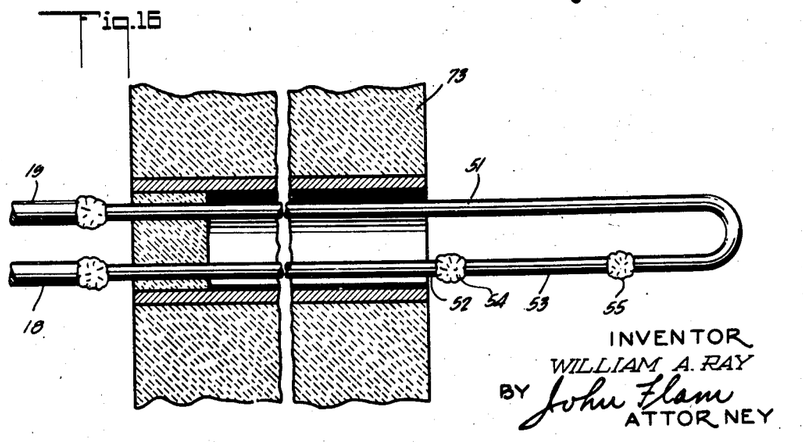
Fig. 16 is an enlarged sectional view, mainly diagrammatic, of the thermocouple structure utilized in the system of Fig. 15.

Thus, in the form illustrated in Figs. 15 and 16, the flame 72 is illustrated as being propagated within a furnace chamber formed by the walls 73. The thermocouple structure 50 is shown as formed by the two end conductors 51 and 52 held in the wall 73 in the manner similar to that disclosed in connection with Figs. 1 and 2. These conductors 51 and 52 may both be made from "Copel." The intermediate short conductor 53 is fused at its ends to the conductors 51 and 52 and may be made of "Chromel." It is to be noted that the cold junction 54 and the hot junction 55 are disposed in a position facing the flame 72. This is accomplished by bending the end of conductor 51 inwardly.

However, the spacing between junctions 54 and 55 is such that the temperatures attained in these two junctions are suitably different in spite of the fact that the conductivity of conductors 51 and 52 are substantially identical. How this arises may be explained in connection with Fig. 15.

The lines 56, 57, 58 and 59 are intended, diagrammatically, to indicate lines of uniform temperature; that is, these lines may be considered as isotherms. While these lines may be of irregular and unpredictable contour, yet experience shows that there is a decided drop in temperature between the hot junction 55 and the cold junction 54, even when these junctions are placed quite close together. Apparently, this may be explained by the generalization that the hot junction 55 is somewhat closer to the flame 72 than the cold junction 54.

As in the earlier forms, as soon as the flame 72 goes out, there is no longer such a temperature gradient in the furnace chamber, and the temperatures of the junctions 54 and 55 promptly become equalized.

Figure 17:
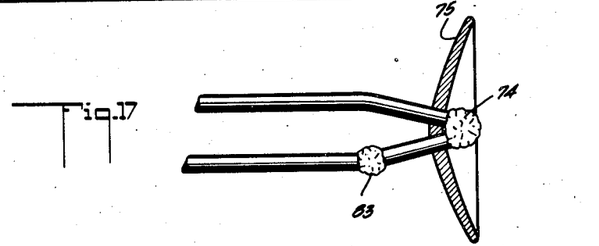
Fig. 17 is a diagrammatic view of a still further modification of the thermocouple structure.

In order further to enhance the effect or radiant heat of the flame, the hot junction may be arranged to receive a greater amount of heat than the cold junctions. Such an arrangement is diagrammatically indicated in Fig. 17. Here there are indicated the cold junction 83 and the hot junction 74. The hot junction 74 is shown as surrounded by a member or shield 75 which receives radiant heat and absorbs it, for conducting the heat to the hot junction 74. This member also acts as an effective shield for the cold junction 83.

Those forms of the invention illustrated in Figs. 2, 3, 16, and 17 are specifically claimed in an application Ser. No. 39,477, filed July 19, 1948, in the name of William A. Ray, and entitled: "Oil burner safety control system."

That form of thermocouple involving the use of end conductors made from materials that have different thermal conducting properties is described and claimed in an application Ser. No. 38,343, filed July 12, 1948, in the name of William A. Ray.

What is claimed is:

1. A thermocouple structure formed of two end conductors and an intermediate conductor, all three conductors being serially joined to form a pair of thermoelectric junctions, said end conductors being of thermoelectrically similar materials, and said intermediate conductor being of a material thermoelectrically dissimilar to that of the end conductors, both junctions thus formed being inserted in a flame and located at points in the flame that would have substantially the same temperature if the junctions be removed from the flame, the mass of the metal per unit length of one of the end conductors connected to one junction being greater than the mass per unit length of the metal in the other end conductor, that end conductor which has the less mass per unit length serving as one of the conductors that form the hot junction.

2. In a thermocouple structure, three thermoelectric metallic conductors serially joined, the adjacent conductors being thermoelectrically dissimilar, one of the two junctions thus formed being a hot junction, and the other being a cold junction, both of said junctions being directly inserted in a flame, the mass per unit length of the metal of an end conductor connected to the cold junction being greater than the mass per unit length of the metal of the other end conductor connected to the hot junction, said other end conductor being interposed between the end conductor that is connected to the cold junction and the root of the flame, thus serving to shield the other end conductor from the flame.

3. A thermocouple structure having a hot and a cold junction both directly inserted in a flame, comprising three thermoelectric conductors forming the two junctions, those conductors that are joined together being thermoelectrically dissimilar, the cross sectional area of one end conductor being greater that that of the other end conductor.

4. A thermocouple structure having a hot and a cold junction both directly inserted in a flame, comprising three thermoelectric conductors forming the two junctions, those conductors that are joined together being thermoelectrically dissimilar, the cross sectional area of one end conductor being greater that that of the other end conductor, the end conductors having substantially equal lengths within the flame.

5. A thermocouple structure formed of two end conductors and an intermediate conductor, all three conductors being serially joined to form a pair of thermoelectric junctions, said end conductors being of thermoelectrically similar materials, and said intermediate conductor being of a material thermoelectrically dissimilar to that of the end conductors, both junctions thus formed being inserted in a flame and located at points in the flame that would have substantially the same temperature if the junctions be removed from the flame, the mass of the metal per unit length of one end conductor being greater than the mass per unit length of the other end conductor, said end conductors being substantially equi-distant from the root of the flame, that end conductor which has the less mass per unit length serving as one of the conductors that form the hot junction.

WILLIAM A. RAY.

REFERENCES CITED

The following references are of record in the file of this patent:

UNITED STATES PATENTS

| Number | Name | Date |
| --- | --- | --- |
| 461,437 | Iden | Oct. 20, 1891 |
| 705,186 | Zeleny | July 22, 1902 |
| 715,265 | Heil | Dec. 9, 1902 |
| 1,234,515 | Webb | July 24, 1917 |

(Other references on following page)

UNITED STATES PATENTS

| Number | Name | Date |
|---|---|---|
| 1,643,582 | Martin | Sept. 27, 1918 |
| 1,286,429 | Shindel | Dec. 3, 1918 |
| 1,669,510 | Fearn | May 15, 1928 |
| 1,863,373 | Harrison | June 14, 1932 |
| 2,052,181 | Krogh | Aug. 25, 1936 |
| 2,054,120 | De Florez | Sept. 15, 1936 |
| 2,076,211 | Straatman | Apr. 6, 1937 |
| 2,084,654 | Ray | June 22, 1937 |
| 2,097,838 | Karrer | Nov. 2, 1937 |
| 2,114,446 | Hildebrecht | Apr. 19, 1938 |
| 2,132,057 | Thornbery et al. | Oct. 4, 1938 |
| 2,139,504 | King | Dec. 6, 1938 |
| 2,186,948 | Alder | Jan. 16, 1940 |
| 2,189,829 | Wunsch et al. | Feb. 13, 1940 |
| 2,193,516 | Laing | Mar. 12, 1940 |
| 2,217,785 | Betz | Oct. 15, 1940 |
| 2,305,585 | Alfery | Dec. 22, 1942 |
| 2,310,026 | Higley | Feb. 2, 1943 |

FOREIGN PATENTS

| Number | Country | Date |
|---|---|---|
| 351,712 | Great Britain | July 2, 1931 |